(12) United States Patent
Georgin

(10) Patent No.: US 11,305,745 B2
(45) Date of Patent: Apr. 19, 2022

(54) SHUTOFF VALVE CONTROL SYSTEM

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 468 days.

(21) Appl. No.: 16/353,819

(22) Filed: Mar. 14, 2019

(65) Prior Publication Data
US 2020/0290580 A1    Sep. 17, 2020

(51) Int. Cl.
| | | |
|---|---|---|
| *G06F 7/00* | (2006.01) | |
| *B60T 8/32* | (2006.01) | |
| *B60T 8/17* | (2006.01) | |
| *B60T 8/171* | (2006.01) | |
| *B60T 13/68* | (2006.01) | |
| *B64C 25/42* | (2006.01) | |

(52) U.S. Cl.
CPC .............. *B60T 8/325* (2013.01); *B60T 8/171* (2013.01); *B60T 8/1703* (2013.01); *B60T 13/686* (2013.01); *B64C 25/426* (2013.01)

(58) Field of Classification Search
CPC .......... B60T 8/35; B60T 8/1703; B60T 8/171; B60T 13/686; B64C 25/426; G06F 7/00
USPC .......................................................... 701/3
See application file for complete search history.

(56) References Cited

U.S. PATENT DOCUMENTS

| | | | | |
|---|---|---|---|---|
| 5,962,777 A * | 10/1999 | Salamat | .................... | B60T 7/12 340/453 |
| 6,089,504 A * | 7/2000 | Williams | .................. | B64C 1/00 244/53 B |
| 6,183,051 B1 * | 2/2001 | Hill | .......................... | B60T 8/00 303/122.03 |
| 7,128,376 B2 * | 10/2006 | Williams | .............. | B60T 8/1703 303/15 |
| 9,039,102 B2 * | 5/2015 | Cahill | ................... | B60T 8/1703 303/20 |
| 9,387,840 B1 * | 7/2016 | Cahill | ................... | B60T 17/221 |
| 2009/0240412 A1 * | 9/2009 | Cahill | ..................... | B60T 8/885 701/70 |

(Continued)

FOREIGN PATENT DOCUMENTS

| | | |
|---|---|---|
| CN | 108216597 | 6/2018 |
| GB | 2458378 | 9/2009 |
| WO | 2008065335 | 6/2008 |

OTHER PUBLICATIONS

European Patent Office, European Search Report dated Mar. 9, 2020 in Application No. 19213886.5.

(Continued)

*Primary Examiner* — Shardul D Patel
(74) *Attorney, Agent, or Firm* — Snell & Wilmer L.L.P.

(57) ABSTRACT

Systems and methods for shutoff valve control are provided. The system may receive a first hardware logic input, a second hardware logic input, and a weight-on-wheels (WOW) status wherein each of the first hardware logic input, the second hardware logic input, and the WOW status report a binary true or a false. The system may open the shutoff valve when each of the first hardware logic input, the second hardware logic input, and the WOW status report true. The system may close the shutoff valve when any of the first hardware logic input, the second hardware logic input, and the WOW status report false.

20 Claims, 5 Drawing Sheets

(56) References Cited

U.S. PATENT DOCUMENTS

2010/0057320 A1* 3/2010 Whittingham ........ B60T 8/1703
  701/70
2018/0016933 A1* 1/2018 Elbibary ................. F01D 21/12

OTHER PUBLICATIONS

European Patent Office, European Office Action dated Jun. 18, 2021 in Application No. 19213886.5.

* cited by examiner

SHUTOFF VALVE CONTROL SYSTEM

FIELD

The present disclosure relates generally to valves, and, more specifically, to hydraulic, pneumatic, or other systems and methods for shutoff valve control for aircraft brake systems.

BACKGROUND

Aircraft often include one or more landing gear that comprise one or more wheels. Wheels may comprise friction brakes which may be hydraulically operated to slow or stop the aircraft. Some valves provide proportional hydraulic pressure based on proportional control signal. Other valves provide simple open/closed functionality.

SUMMARY

In various embodiments, a system for shutoff valve control is proved. The system may receive a first hardware logic input, a second hardware logic input, and a weight-on-wheels (WOW) status wherein each of the first hardware logic input, the second hardware logic input, and the WOW status report a binary true or a false. The system may open the shutoff valve when each of the first hardware logic input, the second hardware logic input, and the WOW status report true. The system may close the shutoff valve when any of the first hardware logic input, the second hardware logic input, and the WOW status report false.

In various embodiments, the first hardware logic input comprises a first OR gated input based on a first hardware determined wheel speed and a first throttle position, wherein the second hardware input comprises a second OR gated input based on a second hardware determined wheel speed and a second throttle position. In various embodiments, the first hardware logic input and the second hardware logic input report true when each of the first hardware determined wheel speed and the second hardware determined wheel speed are less than a wheel speed threshold, or, when each of the first throttle position and the second throttle position are not forward.

In various embodiments, the system may be receiving a software logic input, wherein the software logic input reports the binary true or false. The system may open the shutoff valve when each of the software logic input, the first hardware logic input, the second hardware logic input, and the WOW status report true. The system may close the shutoff valve when any of the software logic input, the first hardware logic input, the second hardware logic input, and the WOW status report false. In various embodiments the software logic input comprises an override trigger set in response to an autobrake system condition or a taxi condition. In various embodiments, the taxi condition is determined based on set of binary conditions including a first wheel speed, a second wheel speed, a first wheel speed data validity, and a second wheel speed data validity, wherein the first wheel speed and the second wheel speed are set true when each of the first wheel speed and the second wheel speed are less than the wheel speed threshold.

In various embodiments, a system for controlling a shutoff valve may comprise a brake hydraulic system including a proportional valve, wherein the shutoff valve is configured to interrupt fluid communication between the proportional valve and a hydraulic supply and a tangible, non-transitory memory configured to communicate with a first controller, the tangible, non-transitory memory having instructions stored thereon that, in response to execution by the first controller, cause the first controller to perform operations comprising, receiving a first hardware logic input, a second hardware logic input, and a weight-on-wheels (WOW) status wherein each of the first hardware logic input, the second hardware logic input, and the WOW status report a binary true or a false. The operations include opening the shutoff valve when each of the first hardware logic input, the second hardware logic input, and the WOW status report true. The operations include closing the shutoff valve when any of the first hardware logic input, the second hardware logic input, and the WOW status report false.

In various embodiments, the operations include receiving a software logic input, wherein the software logic input reports the binary true or false. The operations may include opening the shutoff valve when each of the software logic input, the first hardware logic input, the second hardware logic input, and the WOW status report true. The operations may include closing the shutoff valve when any of the software logic input, the first hardware logic input, the second hardware logic input, and the WOW status report false. In various embodiments, the software logic input comprises an override trigger set in response to an autobrake system condition or a taxi condition. In various embodiments the taxi condition is determined based on set of binary conditions including a first wheel speed, a second wheel speed, a first wheel speed data validity, and a second wheel speed data validity, wherein the first wheel speed and the second wheel speed are set true when each of the first wheel speed and the second wheel speed are less than the wheel speed threshold. In various embodiments, the system comprises a second controller, wherein the taxi condition is determined by the second controller.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

Figure 1:
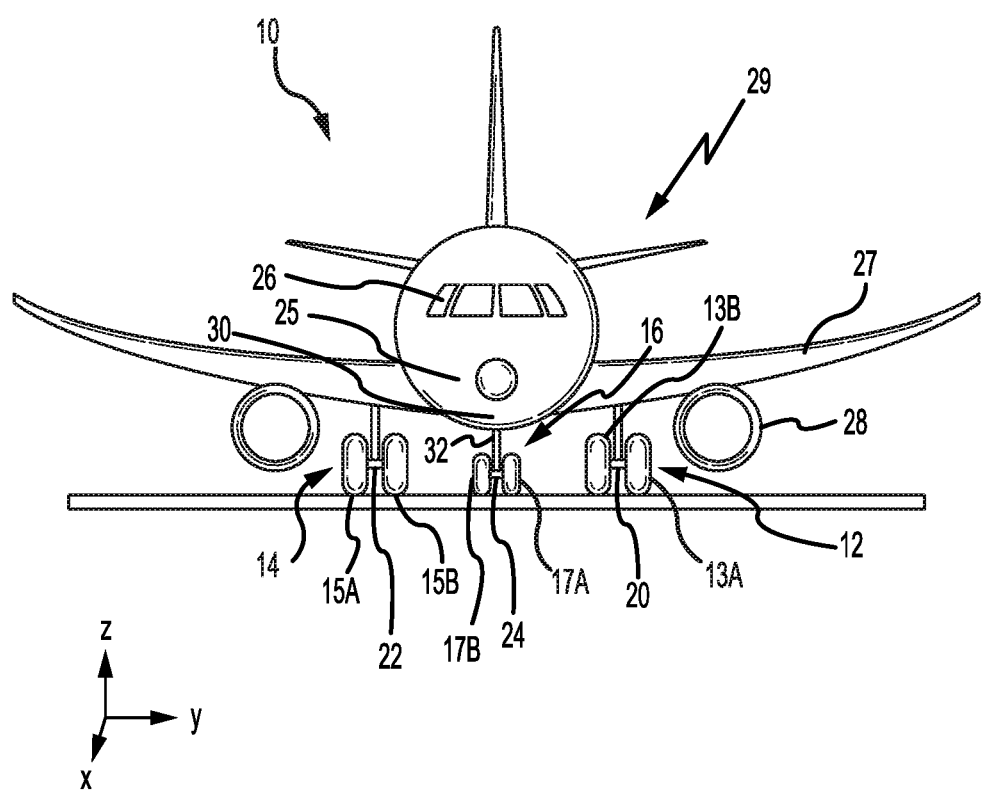
FIG. 1 illustrates an aircraft, in accordance with various embodiments.

With reference to FIG. 1, an aircraft 10 in accordance with various embodiments may comprise aircraft systems, for example, landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage and may comprise an electronic taxi system. Landing gear 12 may include wheel 13A, comprising a friction brake, and wheel 13B comprising a friction brake, coupled by an axle 20. Landing gear 14 may include wheel 15A comprising a friction brake, and wheel 15B comprising a friction brake, coupled by an axle 22. Landing gear 16 may include nose wheel 17A comprising a friction brake, and nose wheel 17B comprising a friction brake, coupled by an axle 24. Any of the friction brakes may be hydraulically operated and may include a proportional control valve to facilitate modulation of brake pressure (i.e., provide a proportional hydraulic pressure to actuate the friction brake) and shutoff valve to inhibit an uncommanded brake condition of the friction brakes. The shutoff valve may inhibit fluid communication between a proportional control valve and hydraulic source. In various embodiments, shutoff valves may tend to cycle frequently tending to reduce valve lifetime and decrease aircraft cabin comfort.

Aircraft 10 may comprise Brake Control Unit (BCU) 25, cockpit controls 26, aerodynamic surfaces 27, and propulsion system 28. Landing gear 14, landing gear 16, and landing gear 12 may be in communication with BCU 25 and may receive commands from BCU 25, for example, to apply friction brakes. In various embodiments, the BCU is typically located in the fuselage of the aircraft. Wires may extend between the fuselage and the BCU at the location of the wheels. The BCU may receive signals or commands from a pilot, from sources external to the aircraft, or from any other suitable onboard sensors known to those skilled in the art. In various embodiments, BCU 25 may be in electronic communication with cockpit controls 26, a shutoff valve 30, ground controls 32, and/or may be in electronic communication with external systems via external command signals 29 such as, for example, radio signals. The BCU 25 may control the shutoff valve 30 in response to the pilot cockpit controls 26, ground controls 32, or external command signals 29. In various embodiments, the BCU may command the shutoff valve 30 to inhibit actuation of the friction brakes based on a shutoff valve control logic.

The BCU 25 may receive feedback from the shutoff valve 30 such as, for example, position feedback, electrical feedback, and/or any other suitable input data. In various embodiments, the feedback may be direct feedback or sensor feedback. The BCU 25 may control the shutoff valve 30 in response to the feedback and/or any other suitable input data. In various embodiments, the BCU may be in electronic communication with the full suite of aircraft sensors and other data sources available within and without the aircraft such as, for example, GPS, radio beacons, remote commands and the like. Sensors may provide aircraft speed, wheel speed, brake temperature, Weight-on-Wheels (WOW) status, landing gear position, pedal position, autobrake setting, thrust reverser position, throttle position, acceleration, aircraft flight phase, and any other suitable input data. The BCU may coordinate the inputs of various sensors with internally stored data or configuration settings and based on the shutoff valve control logic may control the shutoff valve.

Figure 2:
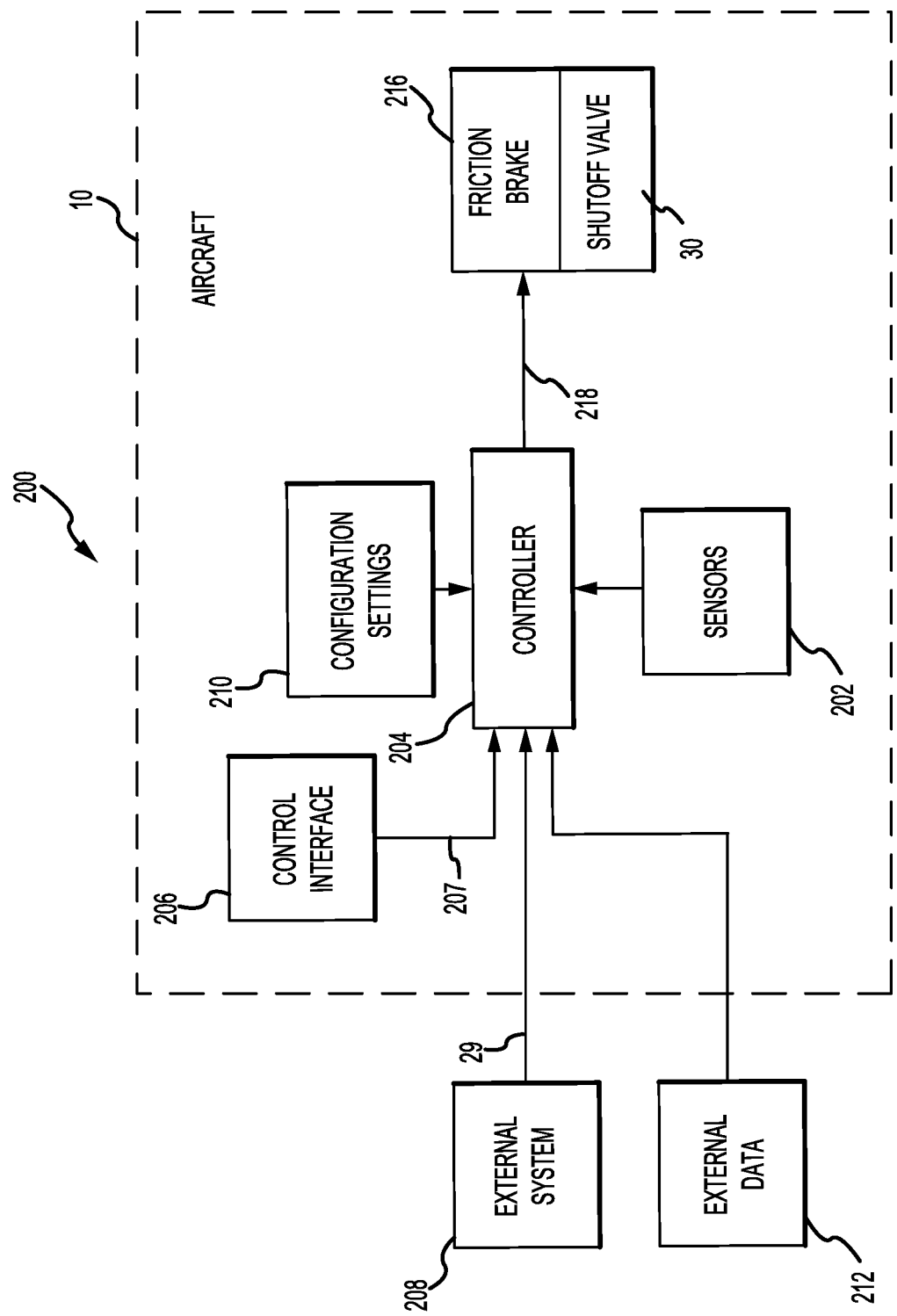
FIG. 2 illustrates a block diagram for a system for shutoff valve control, in accordance with various embodiments.

In various embodiments, and with reference to FIGS. 1 and 2, a system 200 for shutoff valve control may comprise one or more feedback elements to monitor and measure aircraft 10 characteristics. For example, sensors 202 may be coupled to or in direct electronic communication with aircraft systems such as, for example, landing gear 14 comprising a friction brake 216 or, for example, propulsion system. Sensors 202 may comprise a temperature sensor, a torque sensor, a speed sensor, a pressure sensor, a position sensor, an accelerometer, or any other suitable measuring device known to those skilled in the art. Sensors 202 may be configured to measure a characteristic of an aircraft system or component. Sensors 202 may be configured to measure, for example, a landing gear wheel speed, a friction brake pressure, an aircraft airspeed, or a weight-on-wheels (WOW) condition. Sensors 202 may be configured to transmit the measurements to controller 204, thereby providing sensor feedback about the aircraft system to controller 204. The sensor feedback may be, for example, a speed signal, or may be position feedback, temperature feedback, pressure feedback or other data.

In various embodiments, controller 204 may be in electronic communication with a pilot through a control interface 206 of cockpit controls 26, for example, a switch, a pedal or set of pedals that a pilot can operate. The control interface 206 may output a measure of, for example, pedal deflection or switch position, and such output may be used as command signals 207. In various embodiments, controller 204 may be in electronic communication with an external system 208 through external command signals 29. In various embodiments, the information or instruction issued by the pilot or the external system via the command signals is of the form of "open shutoff valve" or "close shutoff valve." In various embodiments, external command signals 29 may include, commands generated from ground controls 32 such as an aircraft handler's control panel located proximate the landing gear 16. In various embodiments, the external command signals may be generated remotely and transmitted via radio to the aircraft 10 and controller 204. In various embodiments, controller 204 may be in electronic communication with configuration settings 210 or library values used by a shutoff valve control logic or other algorithm. In various embodiments, controller 204 may be in electronic communication with external data 212 sources which may be used by the shutoff valve control logic or other algorithm.

In various embodiments, controller 204 may be integrated into computer systems onboard an aircraft, such as, for example, BCU 25. In various embodiments, controller 204 may comprise a processor. In various embodiments, controller 204 may be implemented in a single processor. In various embodiments, controller 204 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3:
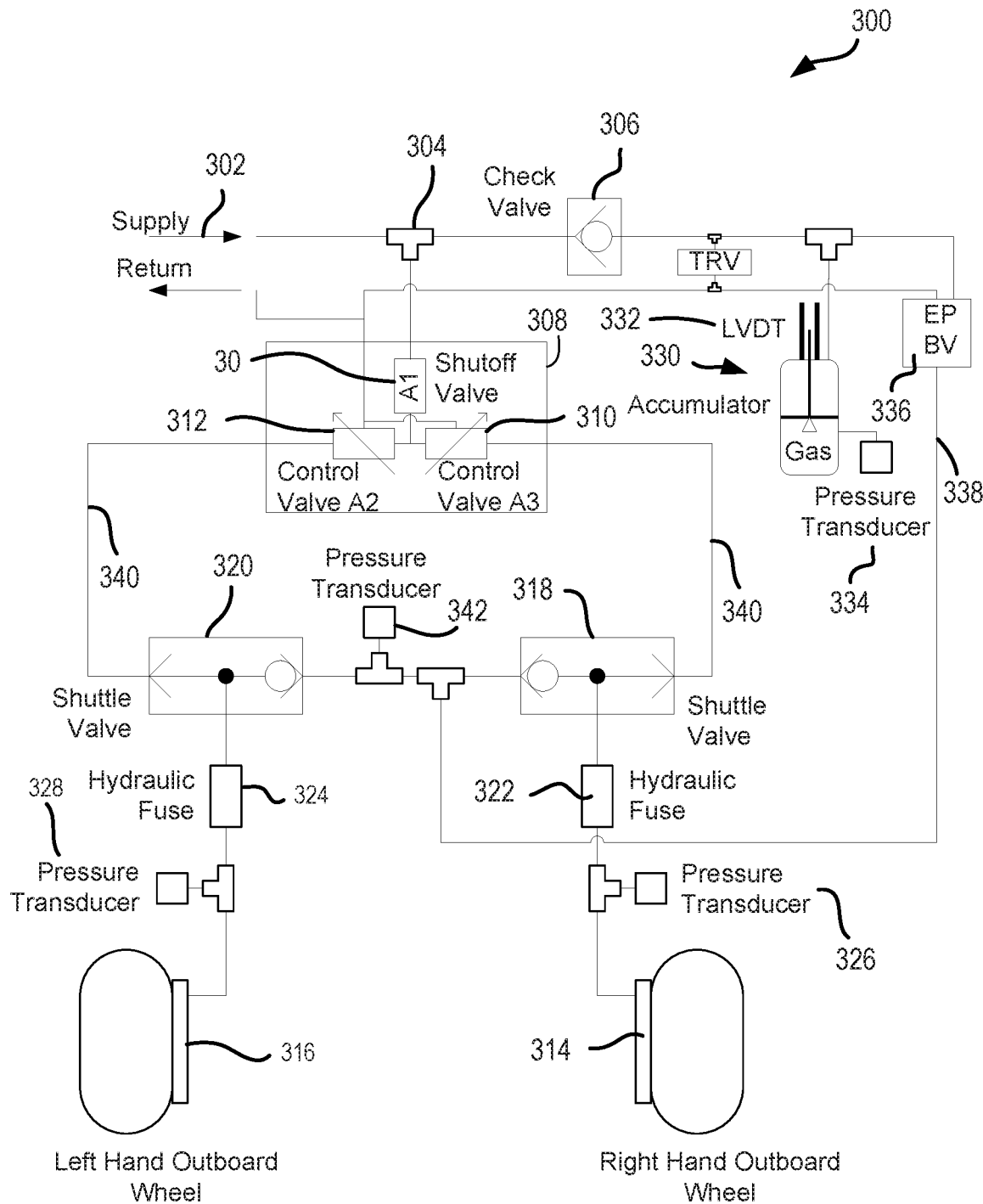
FIG. 3 illustrates a schematic diagram of a brake hydraulic system, in accordance with various embodiments.

In various embodiments and with additional reference to FIG. 3 a schematic diagram of a brake hydraulic system 300 including the shutoff valve 30 is illustrated. Shutoff valve 30 is in fluid communication with a hydraulic supply 302 via fitting 304. System 300 may include a valve box 308 comprising the shutoff valve 30, a first proportional control valve 310 and a second proportional control valve 312. Valve box 308 may be in electronic communication with controller 204 and each of the valves therein may be configured to be controlled by controller 204. The shutoff valve 30 is configured to interrupt fluid communication between the hydraulic supply 302 and each of the first and second proportional control valves (310, 312). The first proportional control valve 310 may be in fluid communication with a first friction brake assembly 314 via primary supply lines 340 thereby enabling pressure control of the respective friction brake. In like regard, the second proportional control valve 312 may be in fluid communication with a second friction brake assembly 316.

In various embodiments, a first shuttle valve 318 and a second shuttle valve 320 may be coupled to the primary supply lines 340 and each fed, respectively, by the first proportional control valve 310 and the second proportional control valve 312. The shuttle valves (318, 320) may be coupled to an emergency brake supply line 338 and configured to selectively receive hydraulic input pressure therefrom. The emergency brake supply line 338 is in fluid communication with an emergency brake valve 336 which may be in fluid communication with a hydraulic accumulator 330. In this regard, hydraulic accumulator 330 may be configured as an alternate supply of hydraulic pressure to the friction brake assemblies (314, 316) via the shuttle valves (318, 320) in response to opening the emergency brake valve 336. In various embodiments, system 300 includes one or more sensors in electronic communication with controller 204. For example, system 300 may include pressure transducers such as a first brake pressure transducer 326, a second brake pressure transducer 328, an emergency system pressure transducer 342, and an accumulator pressure transducer 334. System 300 may include fluid level sensors such as an accumulator level sensor 332 and/or the like. In various embodiments, system 300 may include one or more hydraulic fuses (322, 324) which may tend to limit a loss of hydraulic fluid in the event of damage to hydraulic system elements.

Figure 4A:
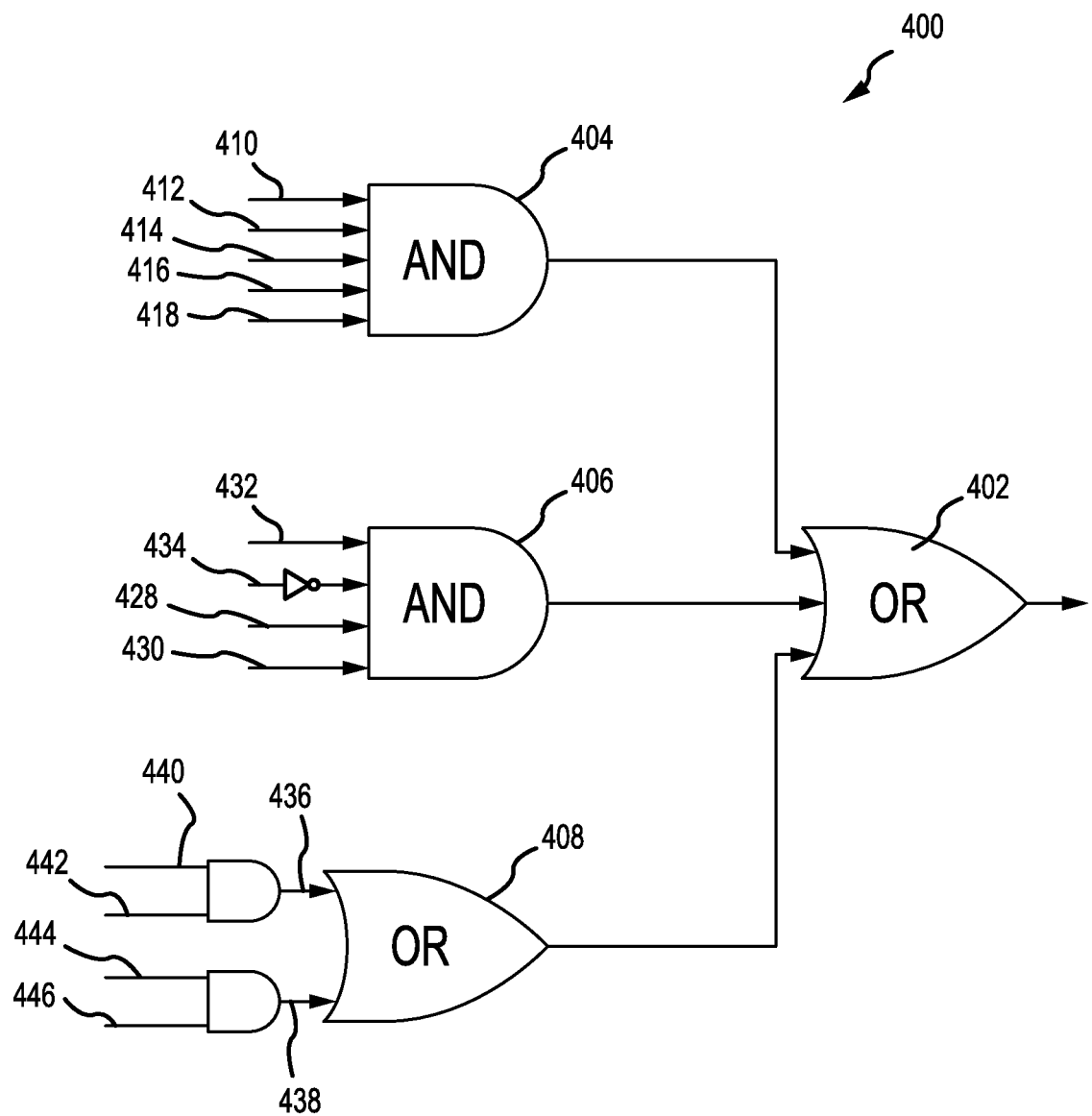
FIG. 4A illustrates a shutoff valve control algorithm, in accordance with various embodiments.
Figure 4B:
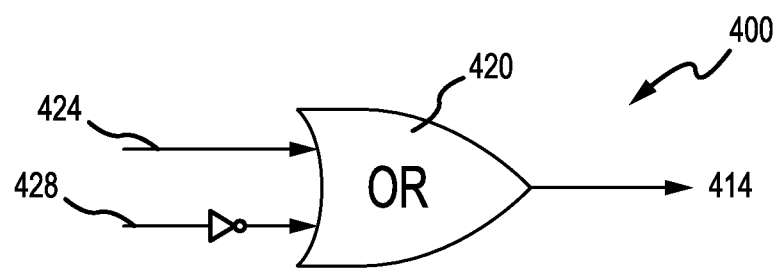
FIG. 4B illustrates a shutoff valve control algorithm, in accordance with various embodiments.
Figure 4B:
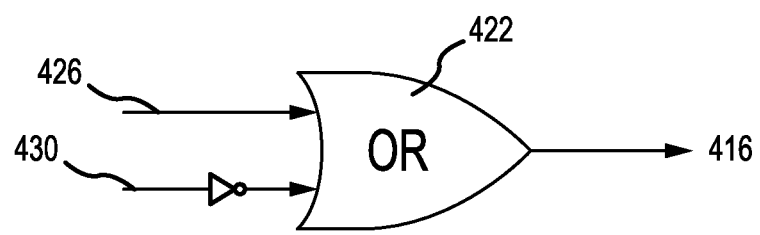

In various embodiments and with additional reference to FIGS. 4A and 4B, controller 204 may be configured to control the shutoff valve 30 based on a control algorithm 400 comprising a combination of software based logic and hardware based logic. Algorithm 400 comprises an OR gated Shutoff Valve (SOV) output 402 (i.e., SOV gate) which commands the shutoff valve 30 to open. Algorithm 400 may include the SOV Gate 402 in communication with a first AND gate 404, a second AND gate 406, and a first OR gate 408. The SOV gate 402 may command the shutoff valve 30 to open in response to TRUE input from any of the first AND gate 404, the second AND gate 406, or the first OR gate 408.

In various embodiments, the first AND gate 404 may receive a first software logic input 410, a second software logic input 412, a first hardware logic input 414, a second hardware logic input 416, and a main landing gear WOW status 418. Each of the first software logic input 410, second software logic input 412, first hardware logic input 414, second hardware logic input 416, and a main landing gear WOW status 418 may be a binary type TRUE/FALSE input. The first AND gate 404 may send a TRUE input to the SOV gate 402 where each of the first software logic input 410, second software logic input 412, first hardware logic input 414, second hardware logic input 416, and a main landing gear WOW status 418 report TRUE.

In various embodiments, the first software logic input 410 may comprise a SOV override trigger set in response to an autobrake system condition (i.e., ARMED or DISARMED) or the controller 204 determining a taxi condition (i.e., an OR gated input). In various embodiments the taxi condition may be a binary condition (i.e, TRUE/FALSE) determined based on a further set of binary conditions including a first wheel speed, a second wheel speed, a first wheel speed data validity, and a second wheel speed data validity. For example, the taxi condition may be set TRUE where each of the first wheel speed and the second wheel speed are determined by the controller 204 to be less than a wheel speed threshold (e.g., less than 40 kts) and each of the first wheel speed data validity and the second wheel speed data validity are TRUE. The taxi condition may otherwise be set FALSE.

In this regard, the SOV trigger may be set where the autobrake system condition is ARMED or the taxi condition is TRUE. In various embodiments, the second software logic input 412 may comprise the SOV override trigger and may be determined by a second controller such as, for example, a second BCU, a second processor card of the first BCU, and/or the like. In this regard the, first and second software logic inputs (410, 412) may be redundant as to controller hardware. Stated another way, the first software logic input 410 may comprise a SOV override trigger determined by a first controller and the second software logic input 412 may comprise the SOV override trigger determined by a second controller.

In various embodiments and with particular reference to FIG. 4B, at least one of the first hardware logic input 414 or the second hardware logic input 416 may comprise an OR gated input. For example, first hardware logic input 414 may comprise a second OR gate 420 based on a first hardware determined wheel speed 424 and a first throttle position 428. The second OR gate 420 may set the first hardware logic input 414 TRUE where the first hardware determined wheel speed 424 is less than the wheel speed threshold or where the first throttle position is IDLE (i.e., not FORWARD). In like regard, the second hardware logic input 416 may comprise a third OR gate 422 based on a second hardware determined wheel speed 426 and a second throttle position 430. The third OR gate 422 may set the second hardware logic input 416 TRUE where the second hardware determined wheel speed 426 is less than the wheel speed threshold or where the second throttle position is IDLE (i.e., not FORWARD). Each of the first throttle position 428 and the second throttle position 430 may be of a binary type.

In various embodiments, the second AND gate 406 may receive the first throttle position 428, the second throttle position 430, a gear retract braking command 432, and a gear down-and-locked (downlock) condition 434. The gear downlock condition 434 may be a binary type set in response to a retracted (FALSE) or extended (TRUE) state of landing gear landing gear such as landing gear 12, landing gear 14 and landing gear 16. The second AND gate 406 may send a TRUE input to the SOV gate 402 where each of the first throttle position 428 and the second throttle position 430 report FORWARD, the gear downlock condition 434 is FALSE (i.e. not TRUE), and the gear retract braking command 432 is received.

In various embodiments, the first OR gate 408 may receive inputs from control interface 206 of cockpit controls 26. The OR gate 408 may receive a first pedal deflection message 436 and a second pedal deflection message 438. Each of the pedal deflection messages (436, 438) may be of the binary TRUE/FALSE type. The first pedal deflection message may be determined based on a hardware determined state of a first brake pedal 440 and a software determined state of the first brake pedal 442. In like regard the second pedal deflection message may be determined based on a hardware determined state of a second brake pedal 444 and a software determined state of the second brake pedal 446.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of controlling a shutoff valve, comprising:
   receiving, by a first controller, a first hardware logic input, a second hardware logic input, a taxi condition and a weight-on-wheels (WOW) status,
   wherein each of the first hardware logic input, the second hardware logic input, the taxi condition and the WOW status report a binary true or a false;
   opening, by the first controller, the shutoff valve in response to receiving the true from each of the first hardware logic input, the second hardware logic input, the taxi condition and the WOW status; and
   closing, by the first controller, the shutoff valve in response to receiving the false from any of the first hardware logic input, the second hardware logic input, the taxi condition and the WOW status.

2. The method of claim 1, wherein the first hardware logic input comprises a first OR gated input based on a first hardware determined wheel speed and a first throttle position, wherein the second hardware logic input comprises a second OR gated input based on a second hardware determined wheel speed and a second throttle position.

3. The method of claim 2, wherein the first hardware logic input and the second hardware logic input report true when each of the first hardware determined wheel speed and the second hardware determined wheel speed are less than a wheel speed threshold; or, when each of the first throttle position and the second throttle position are not forward.

4. The method of claim 3, further comprising:
receiving a software logic input, wherein the software logic input reports the binary true or the false;
opening the shutoff valve in response to receiving the true from each of the software logic input, the first hardware logic input, the second hardware logic input, the taxi condition and the WOW status; and
closing the shutoff valve in response to receiving the false from any of the software logic input, the first hardware logic input, the second hardware logic input, the taxi condition and the WOW status.

5. The method of claim 4, wherein the software logic input comprises an override trigger set in response to an autobrake system condition.

6. The method of claim 5, wherein the taxi condition is determined based on set of binary conditions including a first wheel speed, a second wheel speed, a first wheel speed data validity, and a second wheel speed data validity, wherein the first wheel speed and the second wheel speed are set true when each of the first wheel speed and the second wheel speed are less than the wheel speed threshold.

7. A system for controlling a shutoff valve, comprising:
a brake hydraulic system including a proportional valve, wherein the shutoff valve is configured to interrupt fluid communication between the proportional valve and a hydraulic supply; and
a tangible, non-transitory memory configured to communicate with a first controller, the tangible, non-transitory memory having instructions stored thereon that, in response to execution by the first controller, cause the first controller to perform operations comprising:
receiving, by the first controller, a first hardware logic input, a second hardware logic input, a taxi condition and a weight-on-wheels (WOW) status,
wherein each of the first hardware logic input, the second hardware logic input, the taxi condition and the WOW status report a binary true or a false;
opening, by the first controller, the shutoff valve in response to receiving the true from each of the first hardware logic input, the second hardware logic input, the taxi condition and the WOW status; and
closing, by the first controller, the shutoff valve in response to receiving the false from any of the first hardware logic input, the second hardware logic input, the taxi condition and the WOW status.

8. The system of claim 7, wherein the first hardware logic input comprises a first OR gated input based on a first hardware determined wheel speed and a first throttle position,
wherein the second hardware logic input comprises a second OR gated input based on a second hardware determined wheel speed and a second throttle position.

9. The system of claim 8, wherein the first hardware logic input and the second hardware logic input report true when each of the first hardware determined wheel speed and the second hardware determined wheel speed are less than a wheel speed threshold; or, when each of the first throttle position and the second throttle position are not forward.

10. The system of claim 9, wherein the operations further comprise:
receiving, by the first controller, a software logic input, wherein the software logic input reports the binary true or false;
opening, by the first controller, the shutoff valve when each of the software logic input, the first hardware logic input, the second hardware logic input, the taxi condition and the WOW status report true; and
closing, by the first controller, the shutoff valve when any of the software logic input, the first hardware logic input, the second hardware logic input, the taxi condition and the WOW status report false.

11. The system of claim 10, wherein the software logic input comprises an override trigger set in response to an autobrake system condition.

12. The system of claim 11, wherein the taxi condition is determined based on a set of binary conditions including a first wheel speed, a second wheel speed, a first wheel speed data validity, and a second wheel speed data validity, wherein the first wheel speed and the second wheel speed are set true when each of the first wheel speed and the second wheel speed are less than the wheel speed threshold.

13. The system of claim 12, further comprising a second controller, wherein the taxi condition is determined by the second controller.

14. The system of claim 7, wherein the operations further comprise receiving, by the first controller, a pedal deflection message and opening the shutoff valve in response to the pedal deflection message.

15. An article of manufacture including a tangible, non-transitory computer-readable storage medium having instructions stored thereon that, in response to execution by a first processor, cause the first processor to perform operations comprising:
receiving, by the first processor, a first hardware logic input, a second hardware logic input, a taxi condition and a weight-on-wheels (WOW) status,
wherein each of the first hardware logic input, the second hardware logic input, the taxi condition and the WOW status report a binary true or a false;
opening, by the first processor, a shutoff valve when each of the first hardware logic input, the second hardware logic input, the taxi condition and the WOW status report true; and
closing, by the first processor, the shutoff valve when any of the first hardware logic input, the second hardware logic input, the taxi condition and the WOW status report false.

16. The article of manufacture of claim 15, wherein the first hardware logic input comprises a first OR gated input based on a first hardware determined wheel speed and a first throttle position,
wherein the second hardware logic input comprises a second OR gated input based on a second hardware determined wheel speed and a second throttle position.

17. The article of manufacture of claim 16, wherein the first hardware logic input and the second hardware logic input report true when each of the first hardware determined wheel speed and the second hardware determined wheel speed are less than a wheel speed threshold; or, when each of the first throttle position and the second throttle position are not forward.

18. The article of manufacture of claim 17, wherein the operations further comprise:

receiving, by the first processor, a software logic input, wherein the software logic input reports the binary true or false;

opening, by the first processor, the shutoff valve when each of the software logic input, the first hardware logic input, the second hardware logic input, and the WOW status report true; and closing, by the first processor, the shutoff valve when any of the software logic input, the first hardware logic input, the second hardware logic input, and the WOW status report false.

19. The system of claim 18, wherein the taxi condition is determined based on set of binary conditions including a first wheel speed, a second wheel speed, a first wheel speed data validity, and a second wheel speed data validity, wherein the first wheel speed and the second wheel speed are set true when each of the first wheel speed and the second wheel speed are less than the wheel speed threshold.

20. The system of claim 19, further comprising a second processor, wherein the taxi condition is determined by the second processor.

\* \* \* \* \*